United States Patent [19]

Von Grossmann

[11] Patent Number: 5,123,198
[45] Date of Patent: Jun. 23, 1992

[54] BAIT BUCKET FOR HOLDING BAIT IN MULTIPLE COMPARTMENTS

[76] Inventor: Karl G. Von Grossmann, 8231 Oxborough Ave. South, Bloomington, Minn. 55437

[21] Appl. No.: 673,321

[22] Filed: Mar. 22, 1991

[51] Int. Cl.⁵ ............................................. A01K 97/00
[52] U.S. Cl. ............................................. 43/55; 43/56
[58] Field of Search .................................. 43/55, 56

[56] References Cited

U.S. PATENT DOCUMENTS

| | | |
|---|---|---|
| 299,690 | 6/1884 | Sherwood . |
| 2,480,759 | 8/1949 | Morreau ............................ 43/56 |
| 2,489,710 | 2/1946 | Janisch ............................. 43/56 |
| 2,692,452 | 10/1954 | Myers .............................. 43/56 |
| 2,870,932 | 1/1959 | Davis .............................. 43/56 |
| 2,949,691 | 9/1958 | Johnson ............................ 43/55 |
| 3,002,312 | 10/1958 | Barker ............................. 43/56 |
| 3,009,281 | 11/1961 | Unger .............................. 43/56 |
| 3,196,576 | 7/1965 | Thomas ............................ 43/56 |
| 3,831,310 | 8/1974 | Frangullie ......................... 43/54.5 |
| 3,955,306 | 5/1976 | Handa ............................. 43/55 |
| 4,794,723 | 1/1989 | Arnold ............................. 43/55 |

*Primary Examiner*—Richard K. Seidel
*Assistant Examiner*—Patty E. Hong
*Attorney, Agent, or Firm*—Moore & Hansen

[57] ABSTRACT

There is provided by the present invention a bait bucket for holding bait in multiple compartments, the bait bucket comprising a first bait holding compartment including support means to removably receive and support a second bait compartment.

16 Claims, 3 Drawing Sheets

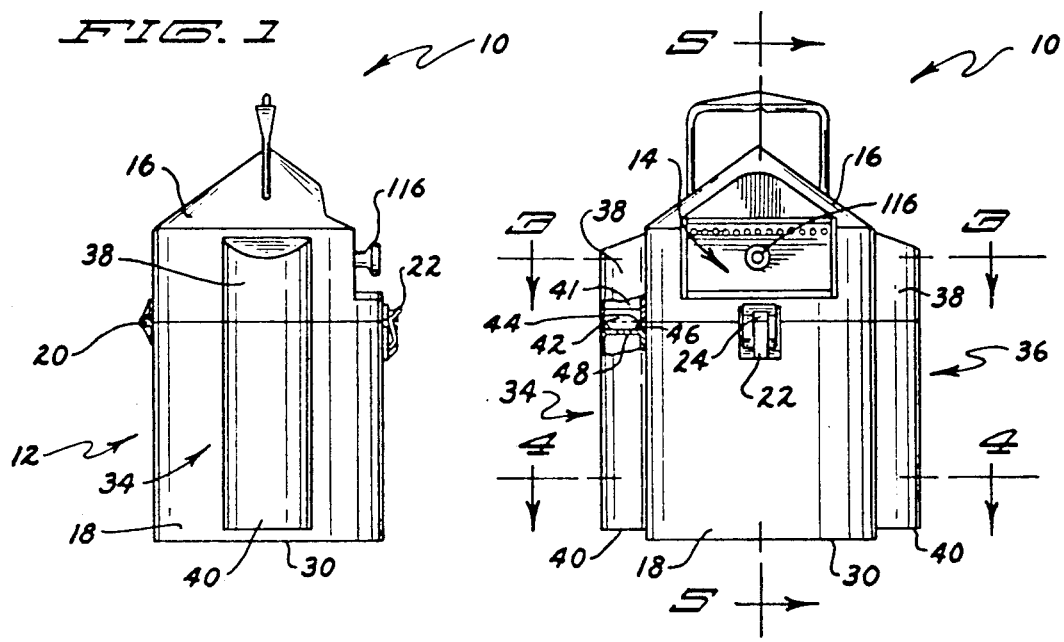
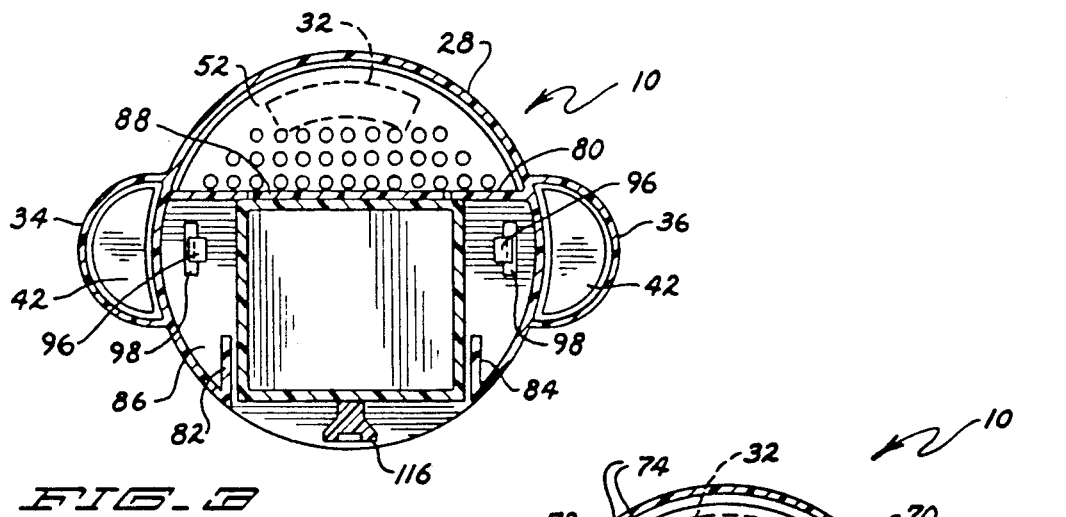
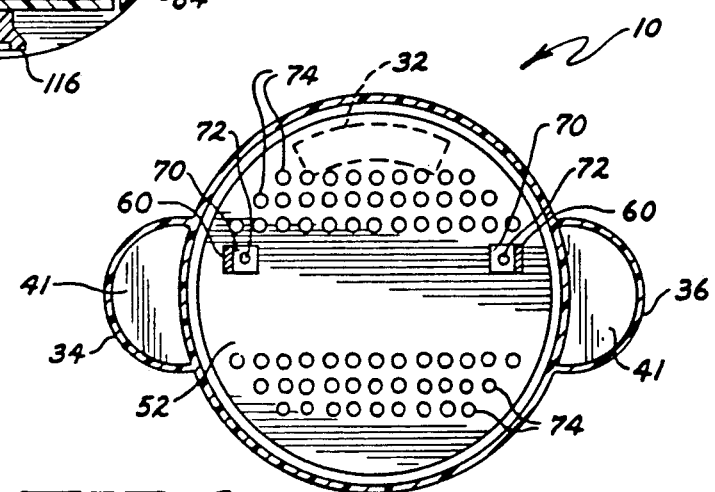

BAIT BUCKET FOR HOLDING BAIT IN MULTIPLE COMPARTMENTS

The present invention relates to a bait container for holding bait used in fishing, in general, and to a new and improved version of such a container for holding multiple kinds of wet bait such as minnows, leeches, and the like, or dry bait such as insects, worms, or the like, or various combinations thereof, in particular.

BACKGROUND OF THE INVENTION

Numerous, varied types of bait containers are known in the prior art. The large majority of these containers are directed towards storing a single kind of bait. Some prior art bait containers, however, do teach the use of multiple containers to store more than one kind of bait. Generally, these containers fall within one of two classifications. They either comprise a single container device partitioned into separate bait holding compartments or a plurality of individually stacked containers. These multiple bait type containers are often constructed so that access to one kind of bait is through a container holding another kind of bait, risking loss of the bait during fishing due to accidental spillage.

A need exists for a bait container capable of housing a plurality of different kinds of bait that a fisherman might find useful on a particular day. In addition, to be useful, such a device should be capable of being operated with one hand and should allow easy access to multiple kinds of bait, particularly wet bait such as minnows, leeches, or the like. In addition, such a device should provide for proper aeration of the water surrounding the wet types of bait and should be easily transportable.

SUMMARY OF THE PRESENT INVENTION

It is a principal object of the present invention to provide new and improved apparatus not subject to the foregoing disadvantages.

It is an object of the present invention to provide a bait container that allows ready access to multiple kinds of bait.

It is another object of the present invention to provide a bait container that is readily operable with one hand.

The foregoing objects of the present invention are achieved by providing a multiple bait container having a first bait compartment integral therewith and a second bait compartment removable from the bait container. The removable bait compartment has a lidded drawer-like configuration and is carried by the bait container therewithin and supported by appropriate support means. The removable bait container may be disposed within an openable lid structure of the first bait container or within an appropriately configured recess disposed within the bottom portion of the container. Each compartment has a plurality of appropriately disposed ventilation and water access holes.

In a preferred embodiment of the present invention, the first bait compartment has a lid structure pivotally and latchably attached to a lower bait containing portion. A perforated, elevatable platform is attached to the lid structure such that as the lid is pivoted open, the platform will be lifted upwardly to the upper edge of the lower portion of the first compartment, thereby lifting and bait upwardly at the same time and thereby reducing the volume in which the bait may be found, thus providing easy access to the bait within the reduced bait container volume. The platform may be attached to the lid by a pair of hinged arms.

In a preferred embodiment the second, removable bait compartment is supported within the pivotal lid structure of the first compartment by means of a horizontally extending platform The lid structure further contains a forward, substantially vertically extending opening for insertion and removal of the second bait compartment. If desired, the lid structure may also include a swingable door allowing access to the first bait compartment when the lid structure is closed.

The second bait container has a substantially box-like configuration and includes a pivotally attached cover providing access to the bait. The second bait compartment may be removably and slidably inserted into the lid of the first bait compartment and is supported therein by the platform. The second compartment may include stop means to prevent it from accidentally being disengaged from the lid structure.

Preferably, the bait container will include floatation means and ballast pre-selected and disposed so that the bait container of the present invention may be placed in the water and so that it floats in a desired orientation and level when placed in the water.

The foregoing objects of the invention will become apparent to those skilled in the art when the following detailed description of the invention is read in conjunction with the accompanying drawings and claims. Throughout the drawings, like numerals refer to similar or identical parts.

BRIEF DESCRIPTION OF THE DRAWINGS

FIG. 1 is a side elevation view of a bait container capable of holding multiple kinds of baits in accordance with the present invention;

FIG. 2 is a front elevation view of the apparatus shown in FIG. 1;

FIG. 3 is a top plan cross sectional view of the apparatus shown in FIGS. 1 and 2 taken along cutting plane 3—3 of FIG. 2 showing the placement of the second bait container within the lid structure of the first bait container;

FIG. 4 is a top plan cross sectional view of the apparatus shown in FIGS. 1 and 2 taken along cutting plane 4—4 of FIG. 2 and showing the elevating platform and lift mechanism associated therewith;

DETAILED DESCRIPTION OF THE PRESENT INVENTION

Figure 5:
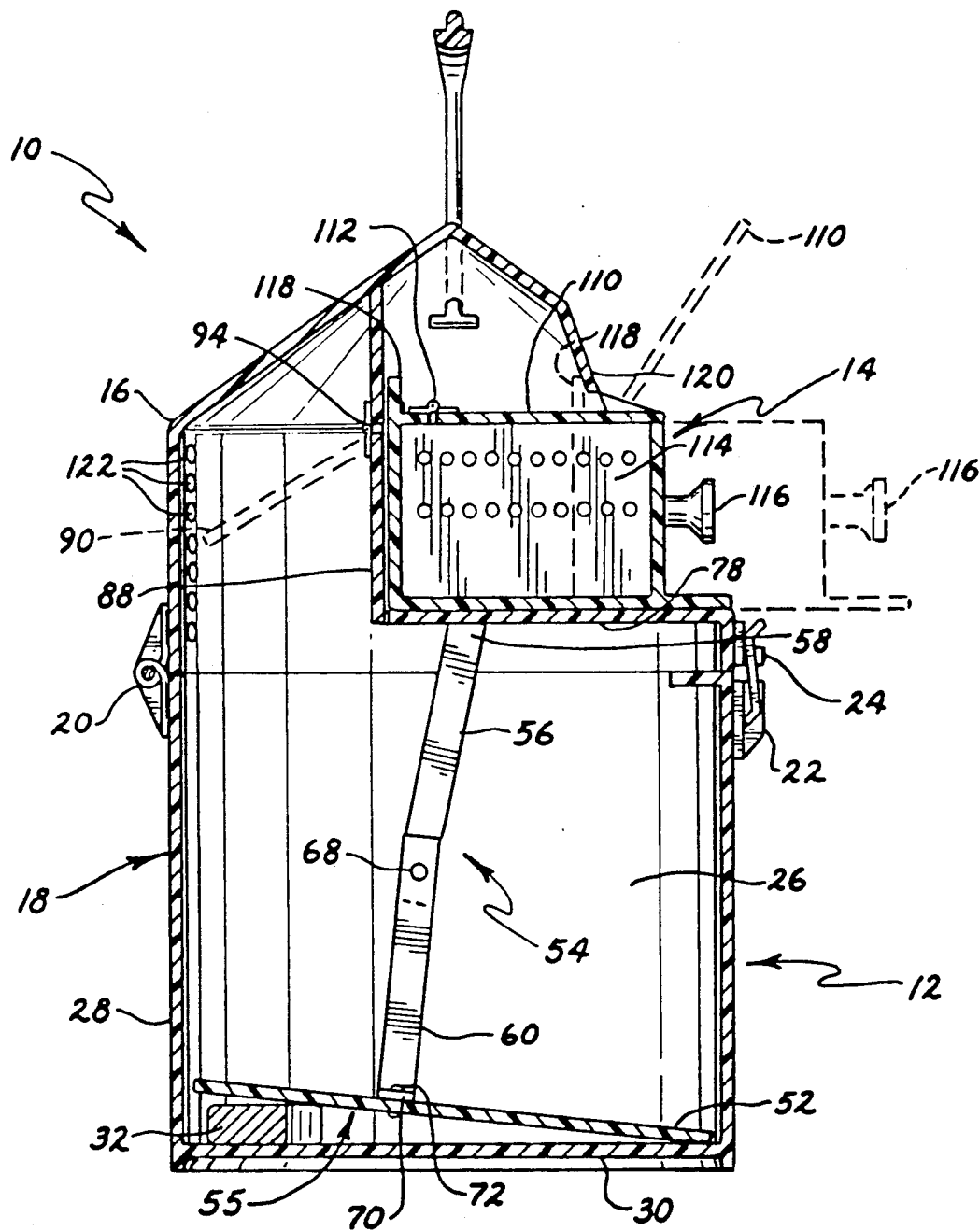
FIG. 5 is a side elevation, cross sectional view of the apparatus shown in FIGS. 1 and 2 taken along cutting plane 5—5 of FIG. 2.
Figure 6:
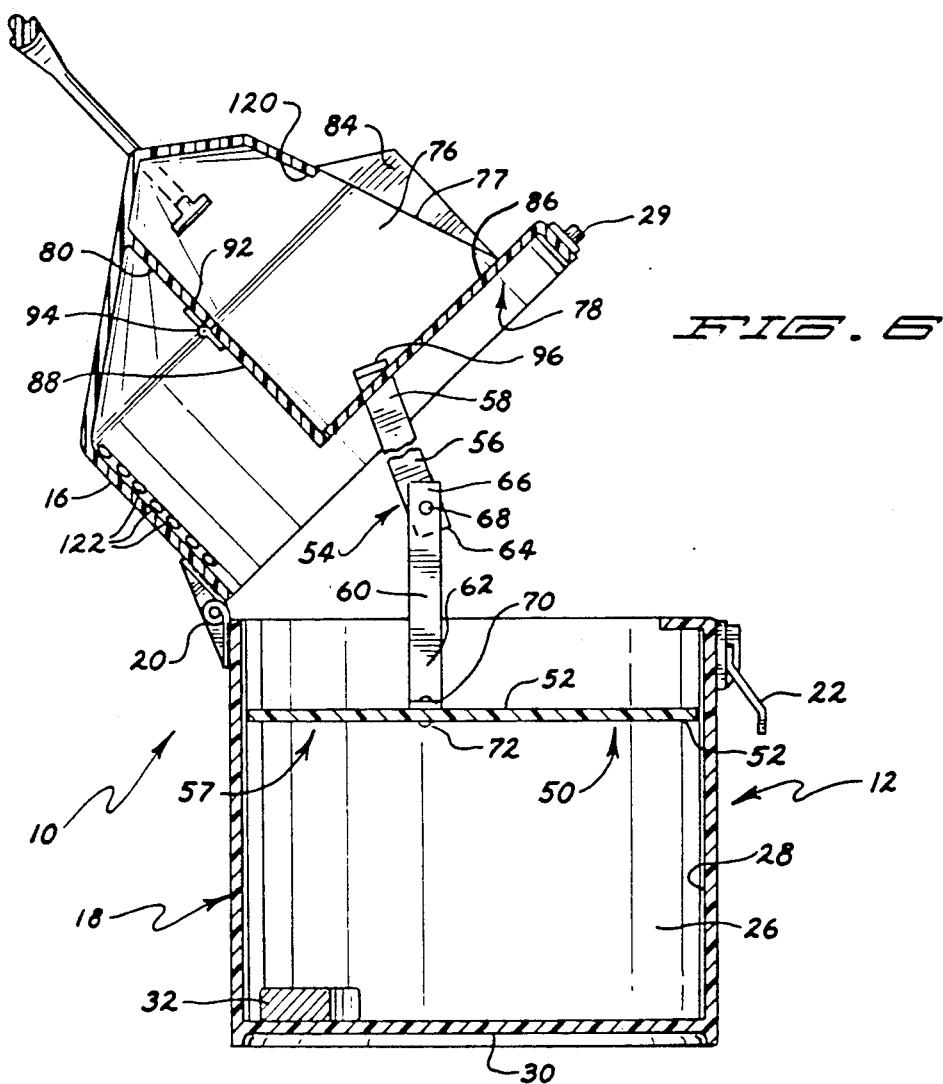
FIG. 6 is a cross sectional, side elevation view of the apparatus shown in FIG. 5 wherein the lid structure of the first bait container is shown in an open position and the elevating platform is shown in a raised position.
Figure 7:
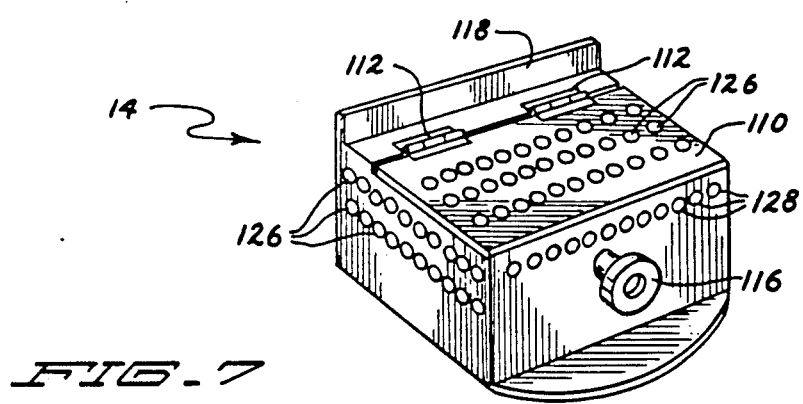
FIG. 7 is a perspective view of the second bait container shown in FIGS. 2, 3, and 5.

FIG. 1 illustrates a bait bucket 10 capable of holding bait in a plurality of individual bait compartments Bait bucket 10 comprises a first bait container 12 and a second bait container 14, best seen in FIG. 7, that is carried within a lid structure 16 of first bait container 12. First bait container 12 includes a lower portion 18 to which lid structure 16 is pivotally attached by a spring hinge 20. Lid structure 16 is releasably attached to lower portion 18 by means of the engagement of a pivotal latch 22, which is shown attached to lower portion 18, with a latch keeper 24, which is shown attached to lid structure 16. Lower portion 18 has a substantially cylindrical first bait confinement area 26, as best seen in FIGS. 5 and 6. Thus, the first bait confinement unit 26 is defined by a cylindrical side wall 28 which is closed at one end by a bottom wall 30. A ballast means 32, such as a lead weight, is fixedly attached to bottom wall 30 and together with a pair of floatation means 34 and 36, functions to orient bait bucket 10 in a desired position and at a desired level when placed in water.

Each floatation means 34 and 36 includes upper and lower portions 38 and 40 respectively Each floatation portion 38, 40 comprises a waterproof chamber. 41 filled simply with air or some buoyant material. Upper floatation portions 38 include a downwardly depending plug member 42 as best seen in FIG. 2. Plug member 42 has a tapered lower edge 44 for insertion in the top 46 of lower floatation portion 40. The bottom of plug member 42 meets and, if desired, may facially engage a seal 48 that sealingly closes the top of chamber 41 of lower flotation portion 40. The tapered lower edge 44 of plug member 42 acts as a guide to aid in the proper closing of lid structure 16.

First bait container 12 may include a means for lifting bait upwardly from the lower portion thereof to an upper portion to aid a fisherman in catching live bait such as minnows. Lifting means 50 may include an elevatable platform 52 which may be raised by lid structure 16 by connecting means 54 such that as lid structure 16 is pivoted open as shown in FIG. 6, elevatable platform 52 will be raised therewith from a resting, bottom position 55 shown in FIG. 5 to a raised position 57 shown in FIG. 6. Connecting means 54 may comprise a pair of arms connected to the elevatable platform 52 and lid structure 16 on the opposing ends thereof. One arm comprises an upper elongate member 56 engagable at its upper end 58 with lid structure 16. The other arm comprises lower elongate member 60 attached at its lower end 62 to elevatable platform 52. The lower end 64 of upper member 56 is hingably attached to the upper end 66 of lower member 60 by a hinge means 68 which may be a hinge pin. Lower end 62 of lower member 60 may be attached to elevatable platform 52 by any known means. As shown in FIGS. 4—6, lower end 62 includes a flange 70 that is connected to elevatable platform 52 by a connection means such as nut and bolt combination 72.

The first container volume 26 will usually be used for transportation and storage of bait such as minnows that require their storage in water. As such, to prevent spillage of the water from the bait containment volume 26 as elevatable platform 52 is raised, platform 52 preferably, has a plurality of flow through holes 74 (FIG. 4) that allow the water to flow through from the upper side of the platform to the lower side thereof as elevatable platform 52 is raised.

Referring principally now to FIGS. 3, 5 and 6, lid structure 16 includes a substantially internally disposed containment unit 76 into which second bait container 14 may be disposed through an access means 77. Containment unit 76 is defined by a lower support means 78, a rear support 80, and left and right side supports 82 and 84 respectively. Lower support means 78 may comprise a platform 86 that extends substantially across the entire extent of lid structure 16. Rear support means 80 comprises a substantially vertically disposed wall structure that extends downwardly from the top of lid structure 16 to where it joins platform 86. Rear support wall 80 may include a swingable door 88 centrally mounted therein and shown in phantom in an open position 90 in FIG. 5. Swingable door 88 is attached to the upper portion 92 of rear support wall 80 by means of a spring hinge 94. Swingable door 88 provides access to first bait confinement volume 26 when second bait container 14 is removed from containment unit 76 without pivoting lid structure 16 open as shown in FIG. 6. Thus, it is possible to fill first bait container with bait through door 88 without pivoting lid structure 16 open as is shown in FIG. 6.

Platform 86 may provide an engagement point for attachment means 54. As shown in FIGS. 3, 5 and 6, upper end 58 of upper arm members 56 includes a flange 96 extending through a longitudinally extending opening or slot 98 in platform 86. Other known means of connection may also be used to form the connection between attachment means 54 and lid structure 16. It is to be noted that upper hinge arm members 58 are free sliding in slots 98. This permits lid structure 16 to, pivot open a limited extent before flanges 96 are engaged by platform 86, as may be required if the hinge line of separation between lid structure 16 and container 12 is at a lower level on container 12 than as shown.

Referring now to FIG. 7, second bait container 14 will be described. As seen in the Figure, second bait container 14 is shown as comprising a box-like structure having a hinged cover 110 attached at the top thereof by a pair of hinges 112. Second bait container 14 defines an internal second bait confinement space 114 for containing a second kind of bait such as leeches. Cover 11 may be pivoted open to provide access to the bait contained therein. Second bait container 14 may include a knob 116 to facilitate handling thereof. Second bait container 14 may also include a stop means 118 disposed along the upper rear wall of container 14. Stop means 118 may comprise a single upwardly extending rib or a plurality of individual prongs. As shown in phantom in FIG. 5, stop means 118 engages the interior of lid structure 16 at the top 120 of access means 77 when pulled forward. Thus, as shown in the Figure, second bait compartment 14 may be slid forward until stop means 118 engages top 120. Cover 110 may then be opened to provide access to the bait held within second bait confinement unit 114 without completely removing second bait compartment 14 from lid structure 16. The interaction of stop means 118 and top 120 of access means 77 further prevents the accidental spilling of second bait compartment 14 from bait bucket 10. Thus, in order to remove completely second compartment 14 from containment unit 76, when second compartment 14 is withdrawn therefrom until stop means 118 interacts with top 120, an upwardly directed force must be applied to the front of second bait container 14 to pivot it around the interacting parts of stop means 118 and top 120 and thus allow the removal of the second bait container 14 therefrom.

The present invention therefore provides a bait bucket capable of holding either two completely different kinds of baits, such as minnows within first bait container 12 and leeches within second bait container 14, or it may allow different sizes of the same bait to be carried within. Ballast 32 keeps bait bucket 10 floating on its backside when placed in water so that water may freely flow within bucket 10 through flow holes 122 located in the lid structure 16. If desired, second container 14 may also include flow through holes 126 to allow the circulation of water therethrough into and out of second bait confinement space 114 when bait bucket 10 is placed in water. The location of holes 126 is such that when lid structure 16 is raised with bait container 14 in place, water will not flow out of bait container 14. If a bait is to be placed within second bait container 14 that is not a wet bait, such as grasshoppers or the like, second bait container 14 may include only ventilating holes 128 located in the front wall thereof. Since bait bucket 10 will be floating with its backside in the water and its front side out of the water where ventilating holes 128 are located, little if any water should enter second container 14 through the ventilating holes. Thus a dry bait, such as insects, will receive air but not water when only ventilating holes 128 are placed within second bait container 14. Because second bait container 14 is removable, both a wet and a dry second bait container may be used in accordance with the present invention.

As previously noted, second bait compartment 14 is substantially slidably received within the container volume 76 formed within lid structure 16 It is also within the purview of the present invention to provide such a container volume at the bottom of bucket 10 by extending cylindrical wall 18 below bottom 30 of first bait container 12 to provide thereby a bottom container volume and then providing appropriate access means and bottom support means within the extended bottom container volume. Such a configuration may be used in lieu of or in addition to the upwardly disposed second bait container 14 as shown in FIGS. 1–7.

The present invention having thus been described, it is contemplated that other modifications, alterations, or substitutions may now suggest themselves to those skilled in the art, all of which are within the spirit and scope of the present invention. It is therefore intended that the present invention be limited only by the scope of the attached claims below.

What is claimed is:

1. A bait bucket for holding bait in first and at least second different compartments, said bucket comprising:
a first compartment for holding bait, said first compartment including a pivotal lid structure supported thereon, said lid structure defining an internal containment unit for selectively and removably disposing said second compartment for holding bait therein, said lid structure comprising support means for supporting said at least second compartment, said support means being disposed internally of said lid structure, and wherein said lid structure includes access means for inserting and withdrawing said second compartment into and from said containment unit.

2. The bait bucket of claim 1 wherein:
said access means is disposed so as to enable said second compartment to be inserted and withdrawn from said containment unit in a substantially horizontal manner.

3. The bait bucket of claim 2 wherein:
said second compartment includes a stop means disposed on the top of said second compartment, said stop means engaging the top of said access means when said second compartment is substantially fully withdrawn from said containment unit so as to prevent said second compartment from being accidentally pulled from said containment unit.

4. The bait bucket of claim 2 wherein:
said support means includes a horizontally extending platform on which said second compartment is slidably supported.

5. The bait bucket of claim 4 and further including:
rear support means for defining the rearward extent of said containment unit, said rear support means extending substantially vertically upwards from said platform.

6. The bait bucket of claim 5 wherein:
said rear support means includes a swingable door for providing access to said first compartment when said lid is closed.

7. The bait bucket of claim 1 wherein:
said bucket includes means for lifting bait upwardly from the lower portion of said first compartment to an upper portion of said first compartment.

8. The bait bucket of claim 7 wherein:
said first compartment is partially defined by at least one side wall; and
said means for lifting includes a lifting platform configured to conform substantially to the configuration of said one side wall of the bucket.

9. The bait bucket of claim 7 wherein:
said means for lifting includes a lifting platform movable by said lid structure through connecting means such that as said lid structure is pivoted open said lifting platform is raised thereby and therewith.

10. The bait bucket of claim 9 wherein:
said connecting means includes a pair of arms, said arms engaging said lid structure on opposing sides and extending substantially vertically downward, each of said arms comprising an upper elongate member engaged at its upper end by said lid structure, a lower elongate member engaged at its lower end by said lifting platform, and said lower end of said upper member and said upper end of said lower member being hingably attached to each other.

11. A bait bucket for holding bait in first and at least second different compartments, said bucket comprising:
a first compartment for holding bait and further including a lid structure mounted thereon for movement between open and closed positions; and
said bucket including means for supporting said second compartment for holding bait, said means for supporting said second compartment being disposed on said lid structure and including a normally horizontally extending platform.

12. The bait bucket of claim 11 wherein:
said bucket includes means for lifting bait upwardly from the lower portion of said first compartment to an upper portion of said first compartment.

13. The bait bucket of claim 12 wherein:
said first compartment is partially defined by at least one side wall; and
said means for lifting includes a lifting platform configured to conform substantially to the configuration of said one side wall of the bucket.

14. The bait bucket of claim 13 wherein:
said lid structure is pivotally supported on said first compartment and said means for lifting includes a lifting platform operably connected to said lid structure by connecting means such that as said lid structure is pivoted open said lifting platform is raised upwardly therewith to carry bait in said first compartment to an elevated access position.

15. The bait bucket of claim 14 wherein:

said connecting means includes a pair of arms, said arms being operably connected to said lid structure on opposing sides and extending substantially vertically downward, each of said arms comprising an upper elongate member connected at its upper end to said lid structure, a lower elongate member attached at its lower end to said lifting platform, and said lower end of said upper member and said upper end of said lower member being hingably attached to each other.

16. A bait bucket for holding bait in first and at least second different compartments, said bucket comprising:
a first compartment for holding bait and further including a lid structure pivotally supported thereon, said lid structure comprising support means for supporting said at least second compartment for holding bait; said bait bucket including means for lifting bait upwardly from a lower portion of said first compartment to an upper portion of said first compartment, said bucket further including connecting means extending between said lid structure and said means for lifting and operable to raise said means for lifting in response to said pivotal opening movement of said lid structure, said connecting means comprising a pair of arms, said arms engaging said lid structure on opposing sides and extending substantially vertically downwardly, each of said arms including an upper elongate member engaged at its upper end by said lid structure, a lower elongate member engaged at its lower end to said means for lifting, and said lower end of said upper member and said upper end of said lower member being hingably attached to each other.

* * * * *

UNITED STATES PATENT AND TRADEMARK OFFICE
CERTIFICATE OF CORRECTION

PATENT NO. : 5,123,198

DATED : June 23, 1992

INVENTOR(S) : Karl G. Von Grossmann

It is certified that error appears in the above-identified patent and that said Letters Patent is hereby corrected as shown below:

Column 4, line 32, delete "11" and insert --110-- therefor.

Signed and Sealed this

Twenty-eighth Day of December, 1993

Attest:

BRUCE LEHMAN

Attesting Officer     Commissioner of Patents and Trademarks